Nov. 29, 1927.

D. E. ROSS 1,651,228

COMPENSATING GEARING

Filed March 12, 1924      2 Sheets-Sheet 1

Inventor
David E. Ross
By Alexander & Dowell
Attorneys

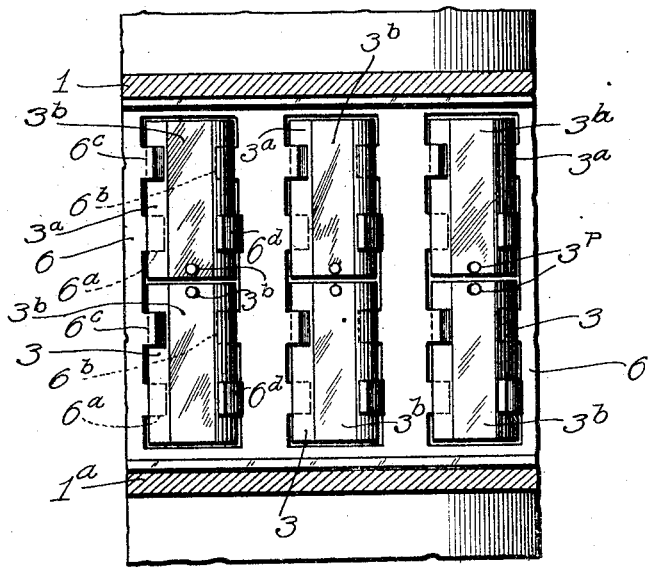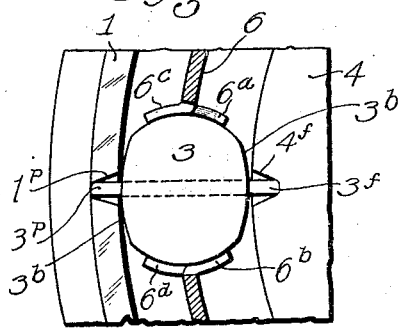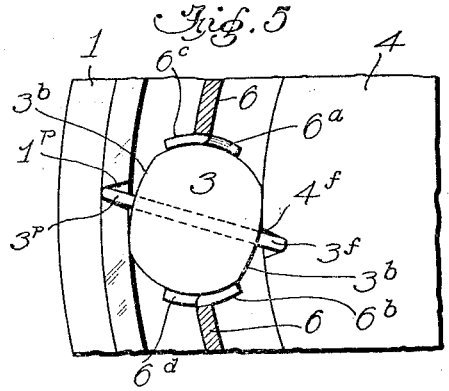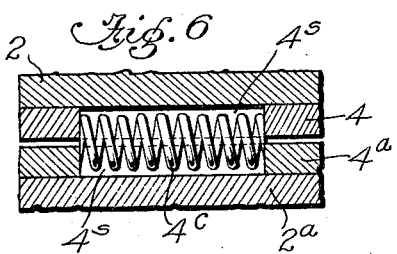

Patented Nov. 29, 1927.

1,651,228

UNITED STATES PATENT OFFICE.

DAVID E. ROSS, OF LA FAYETTE, INDIANA.

COMPENSATING GEARING.

Application filed March 12, 1924. Serial No. 698,656.

This invention is a novel compensating gear, and the principal object of the invention is to produce an inexpensive compensating mechanism so designed that it will prevent spinning of one drive wheel faster than the other when the vehicle is moving straight ahead, but will permit the necessary unequal rotation of the wheels when the vehicle is turning.

The invention is an improvement upon the compensating gear shown in my companion application, (Case 6904) filed February 29, 1924, Serial No. 696,019.

The novel compensating gear in brief comprises two opposed compensating disks respectively fixedly attached to the adjacent inner ends of alined axle or shaft sections; an outer casing or driving member rotatably mounted upon the axle sections and enclosing said disks; a series of preferably rocking cams arranged between each disk and the housing; means for properly spacing the rocking cams; and means whereby the cams are caused to lock both disks to the driving member when the disks are turning at uniform speeds, but when one disk is retarded, or the other disk is accelerated (as in turning the vehicle), the locking cams will be caused to release the faster disk, until the disks again resume practically uniform speed of rotation, as when the vehicle again moves directly forward.

I will explain the invention with reference to the accompanying drawings to enable others to understand and use the same; and refer to the claims for summaries of the invention, and of the novel features of construction and novel combinations of parts, for which protection is desired.

In the accompanying drawings:

Fig. 3 is an enlarged detail sectional view on the line 3—3, Fig. 2.

Figs. 4 and 5 are detail diagrammatic views illustrating the operation of the cam members.

Fig. 6 is an enlarged detail sectional view on the line 6—6, Fig. 2.

Fig. 7 is an enlarged detail sectional view on line 7—7, Fig. 2.

Figure 1:
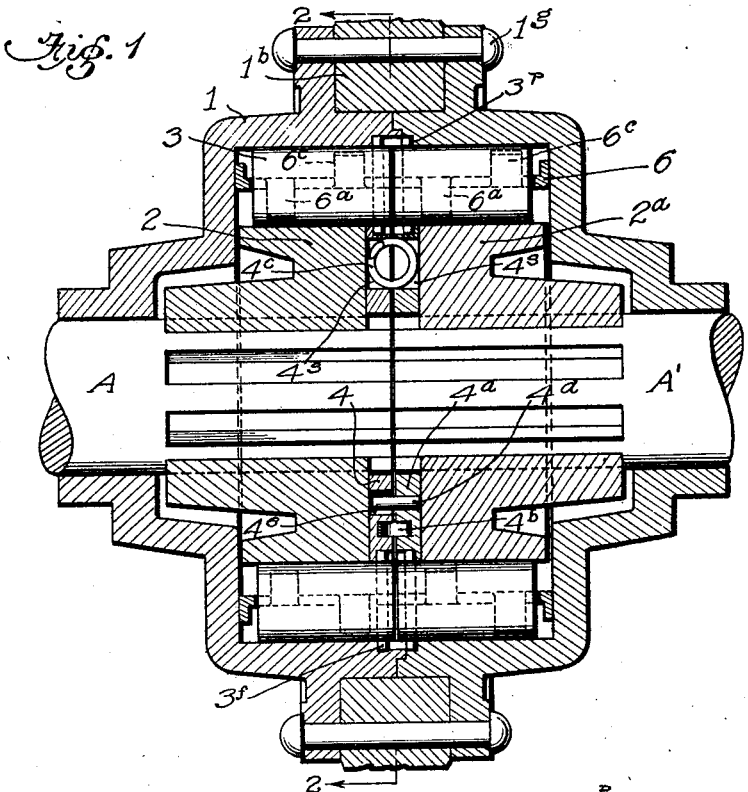
Figure 1 is a vertical section through a compensating gear embodying the invention.

In the drawings I have conventionally illustrated the compensating gear as applied to the driving axle of an automobile. This axle comprises opposite alined shaft sections A, A' on the inner ends of which are mounted similar opposed disks 2, $2^a$, which disks are enclosed within a rotatable driving member or housing.

The housing may be of any desired kind, and rotated by any suitable means, such as are commonly employed. As shown the housing is composed of opposite similar complemental halves 1, $1^a$ united by bolts $1^g$ which also secure a gear $1^b$ of any desired kind to the housing; which gear may be driven as by any suitable means (not shown).

The housing members 1, $1^a$ are rotatably mounted on the shaft sections A, A' in any suitable manner; or as usual in such drives; the inner ends of axle sections A, A' abutting within the housing. The axle sections may be connected at their outer ends to drive wheels of the vehicle (not shown) as usual. The disk 2 is attached to the left hand axle section A, and the disk $2^a$ is attached to the right hand axle section A'. The means for fastening the disks to the axle sections may be of any suitable kind. Each disk is independently interlocked with the housing by means of an annular series of related cam members preferably arranged and adapted to operate as hereinafter explained.

The inner peripheries of the housing members 1, $1^a$ are truly cylindric and concentric to the axes of the axle sections A, A', and each disk 2, $2^a$ is truly cylindric on its outer face, but is of considerably less exterior diameter than interior diameter of the housing 1, $1^a$, the space between the outer periphery of the disks 2, $2^a$ and the inner periphery of the housing 1, $1^a$, forming an annular chamber in which chamber are disposed two annular series of spaced cylindric rocking cams or clutch elements 3, $3^a$. The clutch elements 3 are adapted to interlock the housing member 1 and the disk 2, and the clutch elements $3^a$ are adapted to lock disk $2^a$ to housing member $1^a$.

The clutch elements 3, $3^a$ may be spaced apart by any suitable means. As shown, I provide an annular cage 6 which is somewhat like a ball-bearing cage, and is shown as pressed out of sheet metal and provided at intervals with openings in the ring adapted to receive the clutch elements 3, $3^a$; and with inwardly projecting lugs 6ᵃ and 6ᵇ, and outwardly projecting lugs 6ᶜ, 6ᵈ; the lugs being disposed on opposite sides of the openings, and opposed lugs being bent toward each other sufficiently to confine the clutch elements 3, 3ᵃ in the openings, while permitting them to turn therein on their individual axes, as indicated in Figs. 4 and 5.

Figure 2:
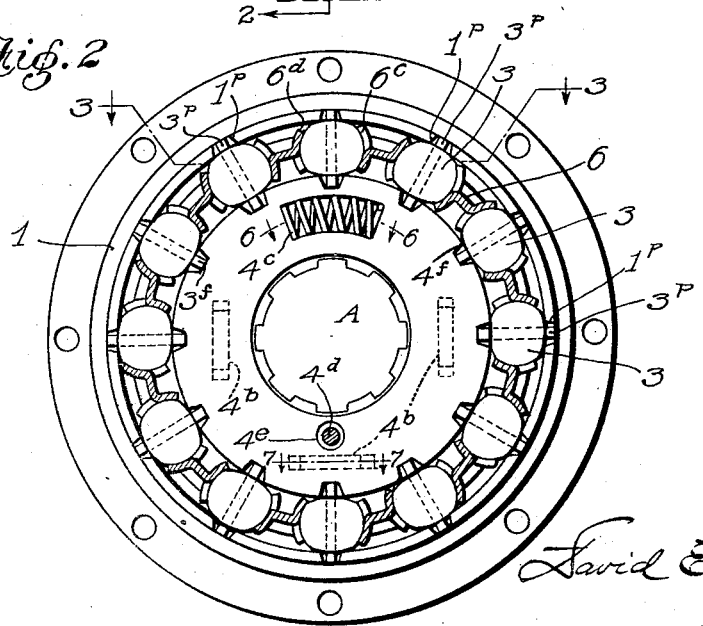
Fig. 2 is a transverse sectional view through the gear on the line 2—2, Fig. 1.

The space between the outer peripheries of the disks 2, 2ᵃ and the inner periphery of the housing member 1, 1ᵃ would not permit truly cylindric clutch elements 3, 3ᵃ to be used; and the cylindric clutch elements 3, 3ᵃ are oblated or somewhat flattened on their inner and outer sides, (as indicated at 3ᵇ in Figs. 2, 3, 4, 5 and 6) so that when they are so positioned between the disks and the housings with their flattened or segmental portions 3ᵇ directly opposite the opposed peripheries of the disks 2, 2ᵃ and housing (as in Figs. 2 and 5) they will not bind the disks or housing; and consequently the disks can rotate freely within the housing, or the housing can freely rotate around the disks; but if the clutch members 3, 3ᵃ are rocked on their axes diametrically opposite parts of the portions 3ᵇ of the clutch members will contact with the opposed peripheries of the disks 2, 2ᵃ and housing 1, 1ᵃ, and (as indicated in Fig. 5) lock the housing to the disks 2, 2ᵃ; thus causing the disks to turn with the housing; or vice versa.

To produce simultaneous locking and releasing motions of all clutch members 3, or 3ᵃ, means are provided whereby the clutch members are normally caused to interlock the housing and disks so that the disks will be driven by the housing, and whereby if one disk exceeds the other in speed (as when the vehicle is turning) the cams will release the fast disk until the disks return to same speeds (as when the vehicle goes straight ahead) then the clutch members are operatively engaged to drive both disks alike. The means for so controlling the clutch members may be greatly varied.

In the construction shown friction members 4, 4ᵃ are interposed between the disks 2, and 2ᵃ, and are normally pressed apart by suitable springs (as f. i. 4ᵇ Figs. 1 and 7) which hold them in frictional engagement with the inner ends of disks 2, 2ᵃ. These friction members 4, 4ᵃ are also normally held in proper relative rotatorial position by means of a suitable spring (f. i. 4ᶜ, Figures 1, 2 and 6, confined in slots 4ˢ in the members 4, 4ᵃ) which spring normally tends to prevent relative rotatorial movement of said members. The extent of relative rotatorial movement of the members 4, 4ᵃ, may be limited, f. i., by a pin 4ᵈ on one member (as 4ᵃ) engaging hole 4ᵉ in the opposed member (as 4) see Figs. 1 and 2.

When the housing 1 is initially turned one of the clutch elements 3, or 3ᵃ will be rotated and immediately lock the related disk to the housing, thereby dragging the related friction member about its own center, and causing all the clutch elements to bind the disks and member, and cause the disks to revolve with the outer housing.

Means are also provided whereby the rotatorial displacement of either member 4 (or 4ᵃ) will cause a rocking of the related clutch members 3 (or 3ᵃ) to either release the related disk or to interlock such disk with the housing; according to the direction of relative rotary movement of the members 4, 4ᵃ.

In the construction shown each clutch member 3 and 3ᵃ has a tooth or pin 3ᶠ on its inner end which engages a notch 4ᶠ in the adjacent friction member 4, (or 4ᵃ). Each cam member also has a like tooth or pin 3ᵖ on its outer end which engages a notch or recess 1ᵖ in the housing section 1, (or 1ᵃ) as indicated in Figures 1, 4 and 5. These pins 3ᶠ, and 3ᵖ, and notches 4ᶠ and 1ᵖ are so spaced and proportioned that when the housing is rotated, and the frictional members 4, 4ᵃ held static between disks 2, 2ᵃ, all the clutch members 3, 3ᵃ will be simultaneously slightly revolved about their own axes through the action of the pins 3ᶠ, 3ᵖ engaging notches 4ᶠ, 4ᵖ, and will turn sufficiently to tightly clutch the disks 2, 2ᵃ, (see Figure 5) and interlock the disks and housing.

When the vehicle turns, the wheel on the outer arc moves a greater distance than the wheel on the inner arc; and if, for example, the disk 2 is attached to the wheel traversing the greater arc the disk 2ᵃ will then rotate faster than the disk 2, and clutch members 3ᵃ will be rocked (by the rotation of member 4ᵃ relative to member 4) in a direction to release the disk 2ᵃ; and the pins 3ᶠ engaging with notches 4ᶠ in member 4 the frictional member 4ᵃ will advance to the limit permitted by pins 4ᵈ (see Figures 1 and 2) engaging the slightly larger holes 4ᵉ, thereby compressing the coil spring 4ᶜ confined in the slots in the frictional members 4, 4ᵃ, the spring 4ᶜ however will restore the frictional members 4, 4ᵃ to their original relative normal position as soon as the speeds of rotation of disk 2, 2ᵃ are equalized and this movement of the disks will, through the pins 3ᶠ and notches 4ᶠ, turn the clutch members 3 back so that when the disks resume the same speed said clutch members 3 will lock the disk 2ᵃ to the housing, thus restoring full traction on both drive wheels.

I at present prefer to employ frictional means between the disks such as illustrated in Figs. 1 to 4; but it is obvious that the frictional means employed may be greatly varied; and also that the connections or means whereby the series of cams are shifted by the frictional means, as required in the effective operation of the compensating gear, may be greatly varied within the scope of the invention.

I claim:

1. A compensating gear comprising; a driving member; two adjacent opposed disks respectively attachable to the adjacent inner ends of alined axle sections, the disks being less in external diameter than the interior diameter of the driving member leaving an annular space between the outer periphery of each disk and the inner periphery of the driving member; a series of clutch members for each disk placed in the said annular space and adapted to lock the disk to the driving member in either direction of rotation thereof; and a pair of friction members located between the adjacent disks and respectively in frictional contact with the inner end of the adjacent disk and respectively engaging said clutch elements whereby when one disk moves faster than the other the related clutch elements are disengaged and the faster disk freed from the driving member; the said clutch elements being re-engaged when the disks resume the same speed.

2. In a compensating gear; a driving member; two adjacent interposed disks respectively attachable to the adjacent inner ends of alined axle sections, the disks being less in external diameter than the interior diameter of the driving member leaving an annular space between the outer periphery of each disk and the inner periphery of the housing; a series of rocking clutch members for each disk placed in the said annular space and adapted to lock the disk to the driving member in either direction of rotation; means for properly spacing the said clutch elements in said space; and a pair of friction members located between the adjacent disks and respectively in frictional contact with the inner end of the adjacent disk and respectively engaging said clutch elements whereby when one disk moves faster than the other the related clutch elements are disengaged and the disk freed from the driving member; and means whereby the said clutch elements are re-engaged when the disks resume equal speed.

3. A compensating gear comprising, a driving member; opposed disks attachable to the adjacent inner ends of alined axle sections, the disks being less in external diameter than the interior diameter of the driving member leaving an annular space between the outer peripheries of the disks and the inner periphery of the housing; a series of clutch members for each disk placed in the said annular space and adapted to lock the disks to the driving member; means for properly spacing the said clutch elements in said space; and means between the disks adapted to be displaced by the rotatorial movement of one disk relative to the other, whereby when one disk moves faster than the other the related clutch elements are disengaged and the faster disk freed from the driving member, the said clutch elements re-engaging said disk when the disks resume same speed.

4. In a compensating gear; a driving or housing member; interposed disks attachable to the adjacent inner ends of alined axle sections, the disks being less in external diameter than the interior diameter of the driving member leaving an annular space between the outer peripheries of the disks and the inner periphery of the housing; a series of rocking clutch members for each disk placed in the said annular space and adapted in one position to lock the disks to the driving member; means for properly spacing the said clutch elements in said space; means interposed between the disks adapted to be displaced by the rotatorial movement of one disk relative to the other; and devices actuated by said means whereby when one disk moves faster than the other the related clutch elements are disengaged and the disk freed from the driving member; and means whereby the said clutch elements are reengaged when the disks resume equal speed.

5. A compensating gear comprising a driving member; opposed disks attachable to the adjacent inner ends of alined axle sections, the disks being less in external diameter than the interior diameter of the driving member leaving an annular space between the outer peripheries of the disks and the inner periphery of the housing; an annular series of clutch elements placed in the said annular space around each disk and adapted to lock it to the driving member; means for properly spacing the said clutch elements in said space; frictional means interposed between the disks adapted to be displaced by the rotatorial movement of one disk relative to the other; and devices actuated by said frictional means whereby when one disk moves faster than the other the related clutch elements are disengaged and the faster disk freed from the driving member; the said clutch elements re-engaging when the disks resume same speed.

6. In a compensating gear, a driving or housing member, interposed disks attachable to the adjacent inner ends of alined axle sections, the disks being less in external diameter than the interior diameter of the driving member leaving an annular space between the outer peripheries of the disks and the inner periphery of the housing; an annular series of rocking clutch elements placed in the said annular space around each disk and adapted in one position to lock the disk to the driving member; a cage for spacing the said clutch elements in said annular space; and means interposed between the disks and frictionally engaged therewith adapted to be displaced by the rotatorial movement of one disk relative to the other and whereby when one disk moves faster than the other the related clutch elements are rocked to disengage said disk from the driving member; the said clutch elements re-engaging when the disks resume equal speeds.

7. In a compensating gear, the combination of a pair of alined axle sections; a pair of opposed disks respectively attached to the axle sections; an outer housing surrounding the disks, the disks being less in external diameter than the interior diameter of the housing leaving an annular space between the outer peripheries of the disks and the inner periphery of the housing; rocking clutch elements in the said annular space adapted to engage the related disks; and means for properly spacing the said clutch elements in said space; frictional means whereby the clutch elements are caused to simultaneously engage the compensating disks on the axle sections to drive the latter uniformly; means whereby when the machine is turning the clutch elements of the faster moving disk are caused to release such disk; and means for causing such clutch elements to re-engage the disk when the disks resume the same speeds.

8. In a compensating gear the combination of a pair of alined axle sections; a pair of opposed disks respectively attached to the axle sections; an outer driving member or housing surrounding the disks, the disks being less in external diameter than the interior diameter of the housing leaving an annular space between the outer peripheries of the disks and the inner periphery of the housing; a series of cylindric rocking clutch elements in the said annular space adapted to engage the related disks; a cage for spacing the said clutch elements in said annular space; frictional means whereby the rocking clutch elements are caused to simultaneously engage the compensating disks on the axle sections to drive the latter uniformly; means whereby when the machine is turning the clutch elements of the faster moving disk are caused to release such disk; and means for causing such clutch elements to re-engage the disk when the disks resume the same speeds.

9. In a compensating gear the combination of an outer member or housing, a pair of opposed disks loosely fitted within the housing and respectively attached to alined axle or shaft sections; the disks being less in external diameter than the interior diameter of the housing leaving an annular space between the outer peripheries of the disks and the inner periphery of the housing; a clutch spacing member in said annular space having a series of openings to receive clutch elements; rocking clutch elements in said openings adapted to lock the related disks to the housing; means whereby the rocking clutch elements are caused to simultaneously engage the disks on the axle sections to drive the latter uniformly; means whereby when the machine is turning the clutch elements of the faster moving disk are caused to release such disk, and means for causing such clutch elements to re-engage such disk when the disks resume the same speeds.

10. In a compensating gear, the combination of an outer driving member or housing, a pair of opposed disks loosely fitted within the housing and respectively attached to alined axle or shaft sections; the disks being less in external diameter than the interior diameter of the housing leaving an annular space between the outer peripheries of the disks and the inner periphery of the housing; a clutch spacing member in said annular space having a series of openings to receive clutch elements; rocking clutch elements in said openings adapted to lock the related disks to the housing; frictional means whereby the rocking clutch elements are caused to simultaneously engage the disks on the axle sections to drive the latter uniformly; means whereby when the machine is turning the clutch elements of the faster moving disk are caused to release such disk; means for limiting the releasing movement of the clutch elements; and means for causing such clutch elements to re-engage such disk when the disks resume the same speeds.

11. In a compensating gear, a driving member or housing; interposed disks attachable to the adjacent inner ends of alined axle sections, the disks being less in external diameter than the interior diameter of the housing leaving an annular space between the outer peripheries of the disks and the inner periphery of the housing; an annular series of rocking clutch elements in said annular space around each disk, and adapted in one position to lock the disk to the housing; friction members interposed between the disks and frictionally engaged therewith, adapted to be displaced by the rotatorial movement of one disk relative to the other, pins or teeth on the said clutch elements respectively engaging opposed teeth or notches in the housing and in said friction members; and whereby when one disk moves faster than the other the related clutch elements are rocked to disengage said disk from the driving member.

In testimony that I claim the foregoing as my own I affix my signature.

DAVID E. ROSS.